Nov. 16, 1965    E. B. ELLIS ETAL    3,217,857
CROSS FEED CONVEYING AND POSITIONING APPARATUS
Filed May 6, 1963    5 Sheets-Sheet 1
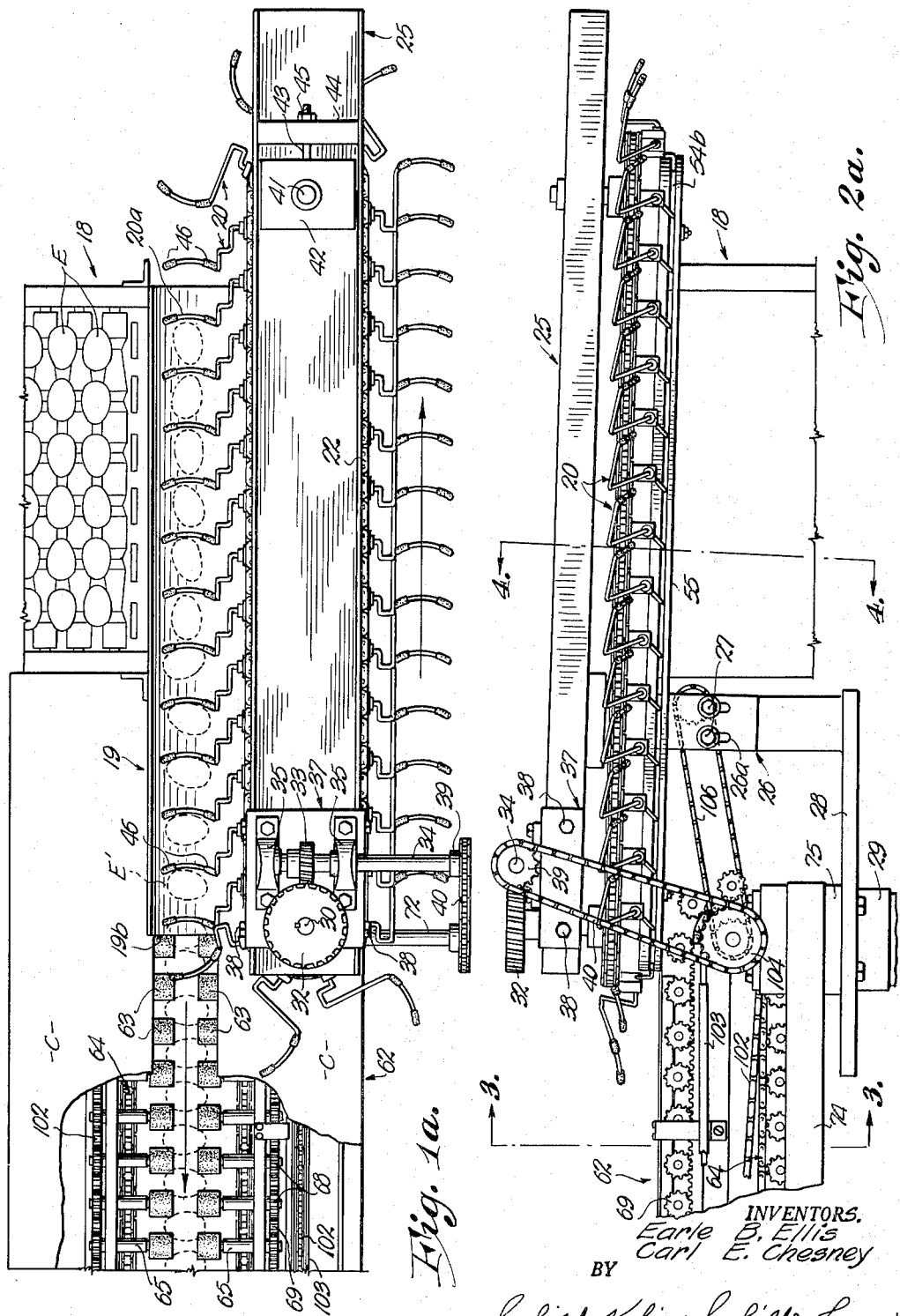
INVENTORS.
Earle B. Ellis
Carl E. Chesney
BY
ATTORNEYS.

INVENTORS.
Earle B. Ellis
Carl E. Chesney
BY
Scofield, Kokjer, Scofield & Lowe
ATTORNEYS.

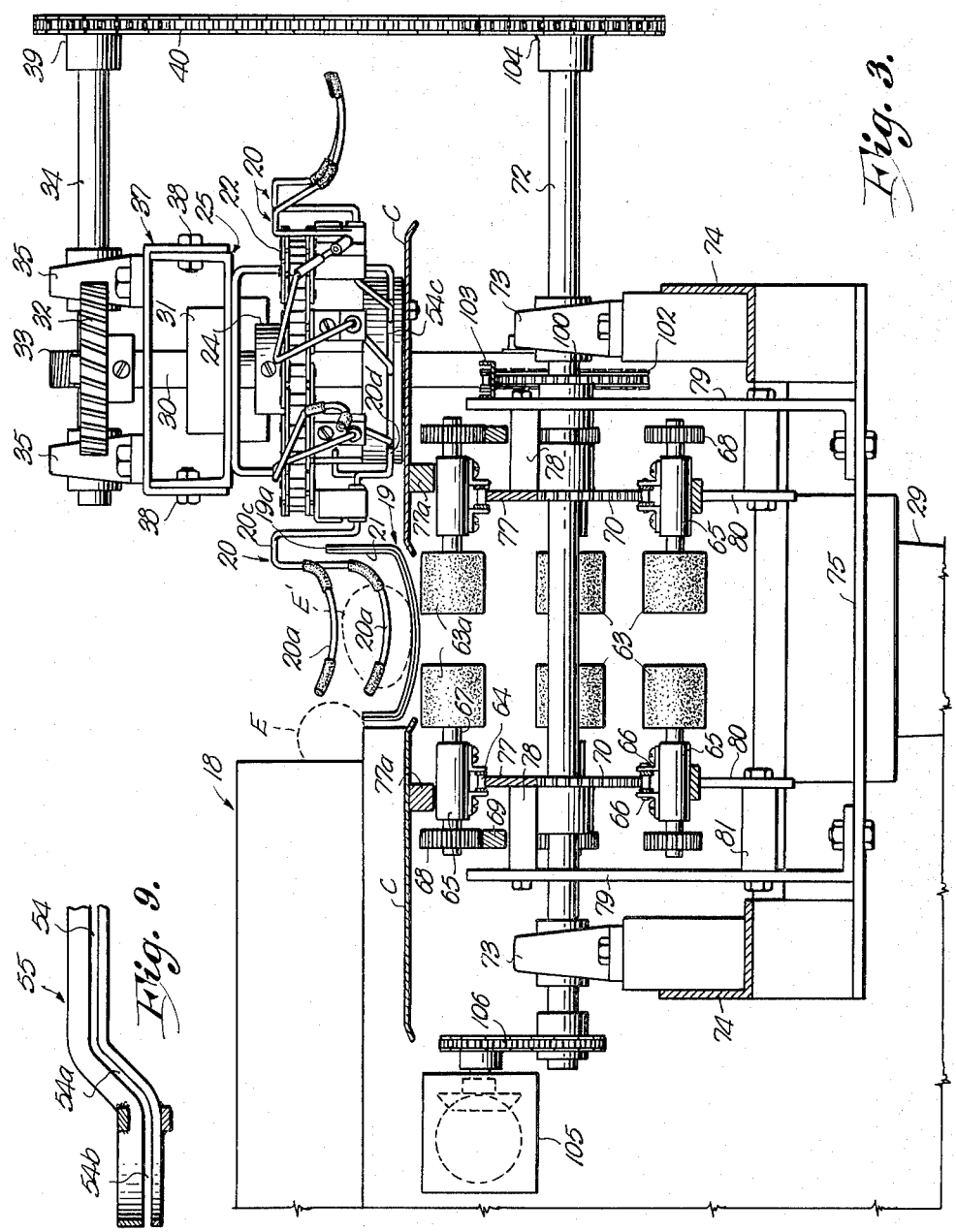

Nov. 16, 1965  E. B. ELLIS ETAL  3,217,857
CROSS FEED CONVEYING AND POSITIONING APPARATUS
Filed May 6, 1963  5 Sheets-Sheet 4

INVENTORS.
Earle B. Ellis
Carl E. Chesney
BY
Serfield, Kokjer, Serfield & Lowe
ATTORNEYS.

Nov. 16, 1965 E. B. ELLIS ETAL 3,217,857
CROSS FEED CONVEYING AND POSITIONING APPARATUS
Filed May 6, 1963 5 Sheets-Sheet 5

INVENTORS.
Earle B. Ellis
Carl E. Chesney
BY
ATTORNEYS.

United States Patent Office 3,217,857
Patented Nov. 16, 1965

3,217,857
CROSS FEED CONVEYING AND POSITIONING
APPARATUS
Earle B. Ellis, 6632 Nall Drive, Mission, Kans., and Carl
E. Chesney, 2551 46th Ave., Kansas City, Kans.
Filed May 6, 1963, Ser. No. 278,153
13 Claims. (Cl. 198—33)

This invention relates broadly to the handling and conveying of materials and refers more specifically to apparatus having particular applicability to the handling and conveying of articles of ovoidal or ellipsoidal shape in general and eggs in particular.

One of the principal objects of the invention is the provision of apparatus operable to receive articles of the character described arranged in an advancing column of parallel rows with the major axis of the articles aligned with the rows and convert the column to a single file of articles moving at high speed with the articles positioned at a selected and uniform orientation. It is a particular feature of the invention that it provides means capable of handling without damage articles having the shape described which are extremely fragile or delicate, the principal use of the invention presently conceived being in the handling and processing of eggs as they are delivered from a conventional candling and row feeding unit.

Another object of the invention is to provide apparatus for the handling and conveying of articles of the character described which is capable of rapidly and gently transporting such articles to a pick-up point with the articles delivered at a predetermined orientation facilitating further handling and processing thereafter.

Among further objects of the invention are to provide improved means for effecting continuous transfer of eggs from a candling unit to a single file conveyor; to provide a single file conveyor means capable of moving eggs of differing sizes and shapes rapidly and gently in single file and at a preselected orientation toward a discharge point; and to provide improved means for progressively removing eggs from said conveyor as they arrive at the discharge point.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views:

FIGS. 1a and 1b taken together comprise a top plan view of an egg feeding mechanism embodying the invention, parts being broken away and other parts in section for purposes of illustration, FIG. 1b being a continuation of FIG. 1a, but not showing the pick-up mechanism;

FIGS. 2a and 2b taken together in the same fashion comprise a side elevational view of same with the pick-up mechanism included, parts of the supporting structure being broken away and shown only in fragmentary form;

FIG. 3 is an enlarged fragmentary sectional view taken generally along line 3—3 of FIG. 2a in the direction of the arrows;

FIG. 5 is an enlarged fragmentary perspective view taken generally from a position at the lower right hand end of FIG. 2a;

FIG. 9 is a fragmentary view of a portion of the slotted control band for the pusher fingers, the view being taken generally along line 9—9 of FIG. 4 in the direction of the arrows.

Figure 1B:
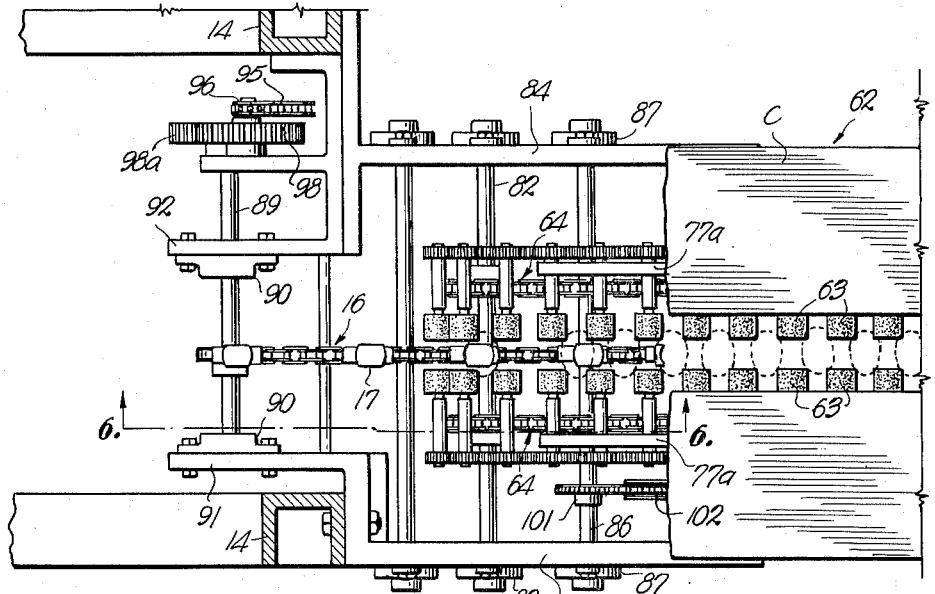

Referring now to the drawings, it may be helpful to a more rapid understanding of the principles and purpose of the invention if first some idea is given of the end result sought.

Figure 2B:
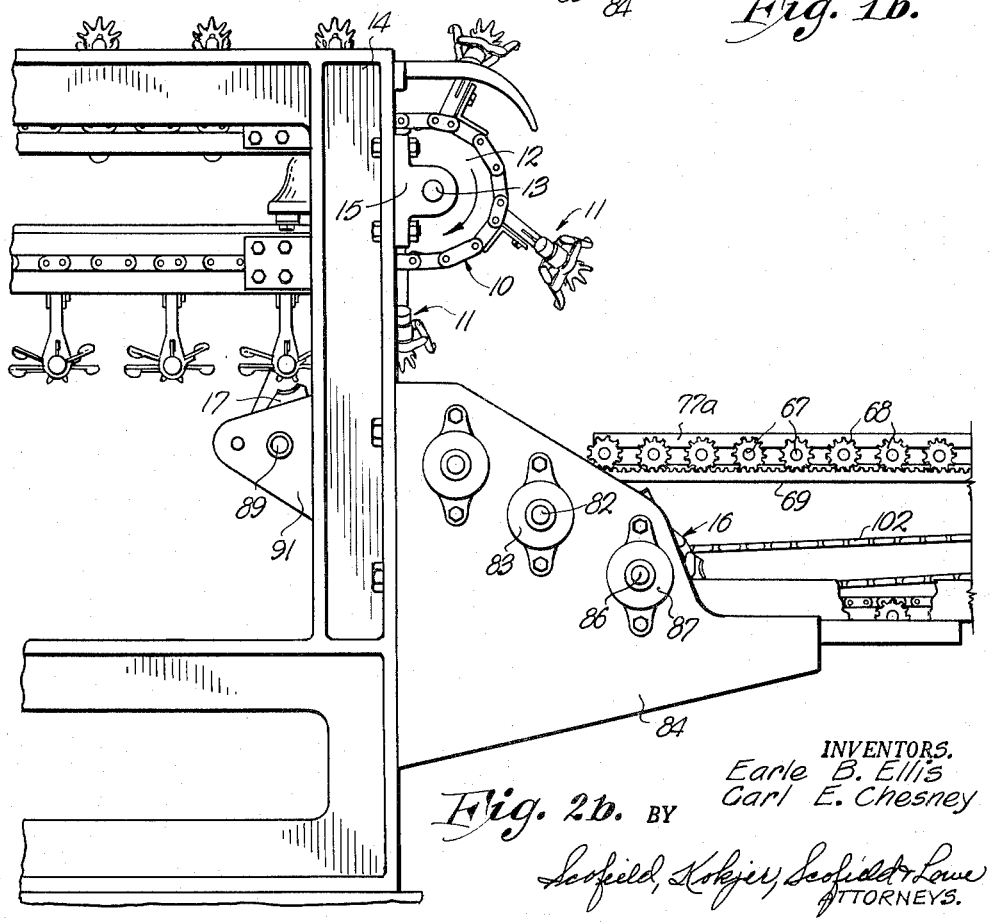
Figure 6:
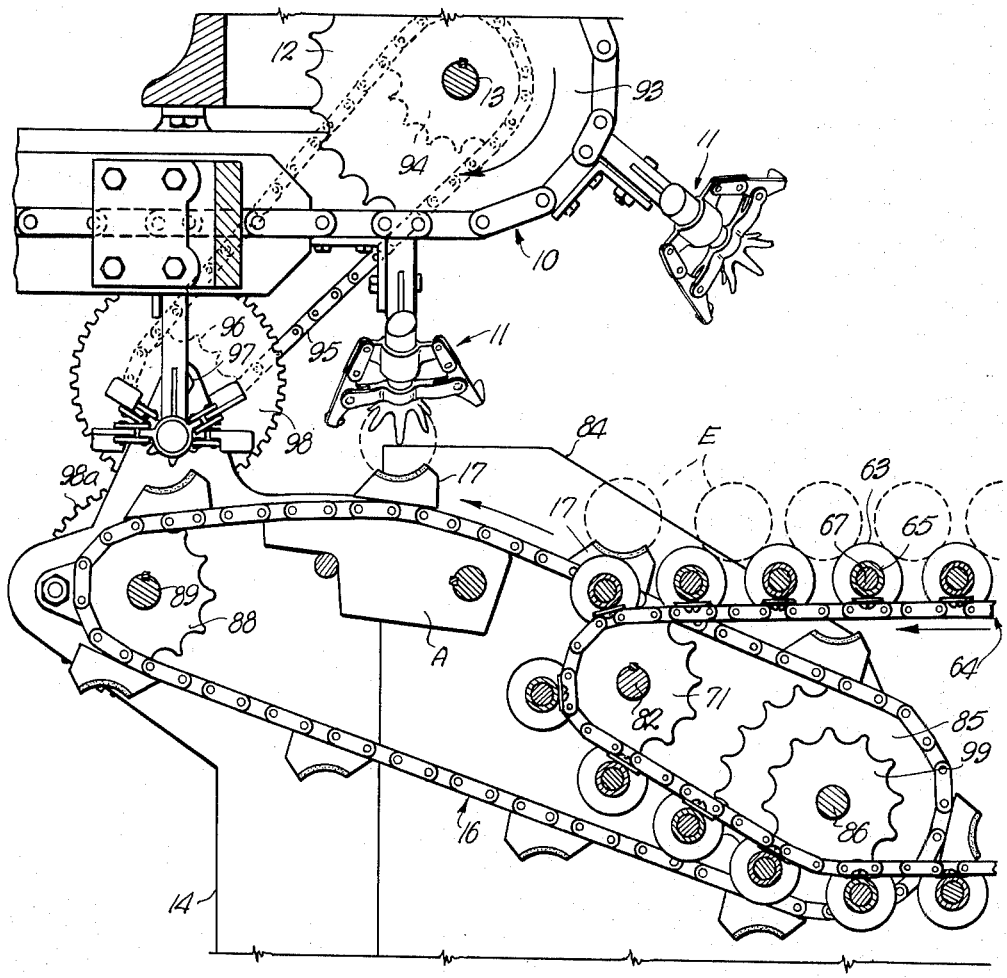
FIG. 6 is an enlarged fragmentary sectional view taken generally along line 6—6 of FIG. 1b in the direction of the arrows.
Figure 7:
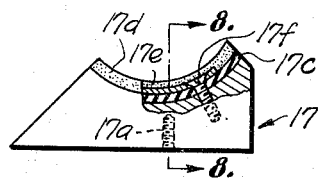
FIG. 7 is a greatly enlarged side elevational view of an egg cradle, parts broken away and in section for purposes of illustration.

To this end, referring initially to FIGS. 1b, 2b and 6, it will be seen that we have shown a portion of an endless chain 10 which has mounted to it at uniformly spaced intervals a series of egg pick-up and holding units 11. The chain is disposed generally with its parallel flights in a common vertical plane and it is trained around a sprocket 12 which in turn is mounted on a horizontal shaft 13. Spaced, upright posts 14 carry bearings 15 in which the opposite ends of shaft 13 are journaled.

The egg handling units 11 and their means of support, operation and drive play no part in the present invention but are described in detail in our application Serial 278,841 filed May 8, 1963. It suffices to explain for the purposes of this application that they are of the type that are so disposed and actuated as to pick up and carry eggs onwardly from a chain conveyor unit 16 having spaced egg cradles 17 which, for a fragment of their movement, move parallel with the track of the pick-up units 11 as they descend about and move away from the sprocket 12.

The chain 10 is driven from a power source (not shown) at a uniform rate so the succeeding pick-up units 11 move in operating registry with the cradles 17. As again may be gained from a study of the aforementioned application, the pick-up units are actuated to close upon and carry eggs onwardly as the cradles drop away therefrom. While we have shown our own preferred form of gripping members, they just as well could be of the type and arrangement described in Patent 2,433,188.

In other words, the purpose of our present invention is to provide means for effecting a continuous high speed flow of a column of eggs spaced at uniform intervals and positioned at a desired attitude.

Figure 4:
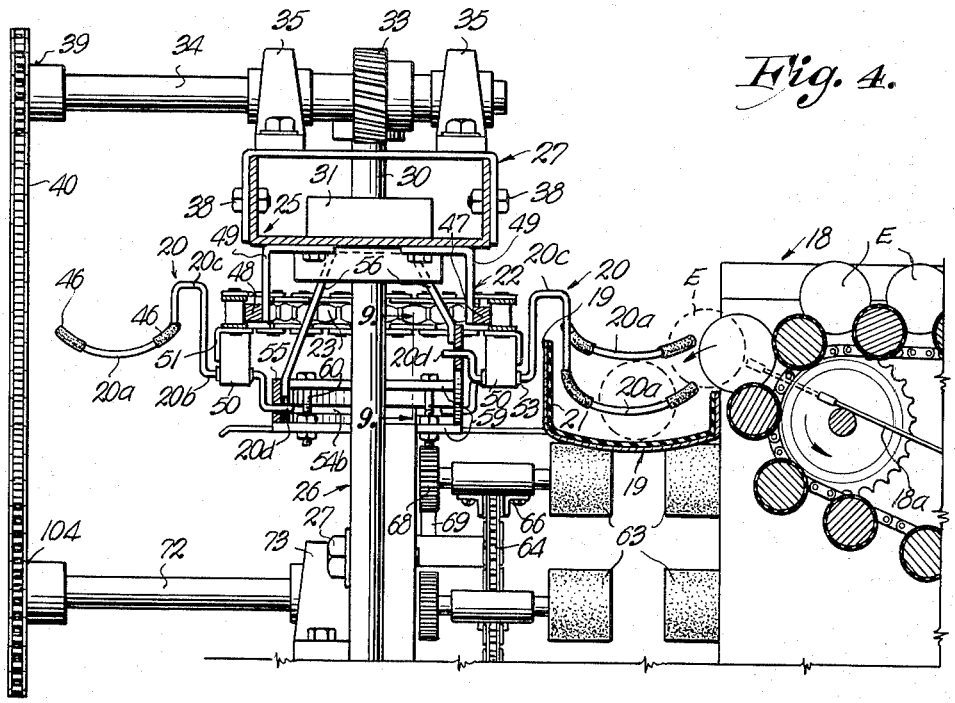
FIG. 4 is an enlarged fragmentary sectional view taken generally along line 4—4 of FIG. 2a in the direction of the arrows.

Referring now to FIGS. 1a, 2a, 3, 4 and 5, the starting point or original source of the eggs comprises the terminal end of an egg candling and feeding mechanism 18 which serves to advance the eggs E in spaced rows, each row in the illustrated embodiment comprising six eggs. The eggs are advanced by the mechanism 18 toward a receiving chute or trough 19 which is disposed transverse to the path of advance of the rows or, in other words, parallel with the rows. The candling and feeding mechanism may be of that type disclosed in Patent No. 2,961,087 issued November 29, 1960, and reference can be had thereto for a more complete description. For the instant application, it is enough to know that at uniform intervals the mechanism 18 delivers a row of eggs to a location adjacent the edge of trough 19 from whence they are pushed into the chute by plungers 18a (FIG. 4). As will be taken up in greater detail at a later point herein, once in the trough the eggs are properly oriented and advanced longitudinally thereof by a series of pusher elements or fingers 20. The rate of feeding of the eggs from mechanism 18 into the trough 19 is so synchronized with the rate of movement of fingers 20 that the next succeeding row is dumped into the trough as soon as the preceding row has been cleared from its path.

Trough 19 is generally U-shaped in cross-section and it is slightly upwardly inclined from right to left (as viewed in FIGS. 1a and 2a). It is supported in stationary fashion by any suitable means, as by securing it to the framework of the side feeding mechanism 18. Preferably, it is lined with a softly resilient material 21, for example, a flexible urethane foam or sponge latex or rubber, in order to reduce the likelihood of breakage of the eggs as they are deposited in the trough from the feeding mechanism.

The trough 19 is open ended and the fingers 20 move longitudinally therethrough from right to left, as viewed in FIGS. 1a and 2a. The fingers are carried by a horizontally disposed endless chain 22 trained around the spaced sprockets 23, 24.

The sprockets 23, 24 and their chain 22 are carried by a supporting framework which includes the main support member 25. This member is, in the illustrated embodiment, of channel cross-section and is rigidly supported at the upper end of an upright predestal 26. The support member 25 runs generally parallel with trough 19 and the pedestal connects with it somewhat forwardly of the center. The main weight of the support member and its associated mechanism later to be described is carried by the pedestal. The pedestal may be constructed of two overlapping relatively adjustable sections joined by bolts 27, the bolts being received in slots 26a which permits some limited variation in the angle of the support member with the horizontal. The pedestal is, in turn, rigidly connected at its lower end with a structural extension 28 carried by a floor-engaging leg 29, only the upper portion of which has been shown.

The sprockets 23, 24 are located beneath and respectively near the opposite ends of support member 25. The forward sprocket 23 is secured to a shaft 30 which is journaled in a suitable bearing 31 carried by the support member. The upper end of shaft 30 is above the support member and has keyed thereto the spiral tooth gear 32. This gear is driven by a worm 33.

The worm 33 is mounted on a horizontal shaft 34 having a portion extending to one side of the structure. This shaft is supported in spaced bearings 35 mounted by bolts 36 on an inverted channel shaped member 37 on top of support member 25. The member 37 is secured by its depending flanges to the adjacent overlapping flanges of the support member 25 by bolts 38. The shaft 34 has secured to its outer end a sprocket 39 which is drivingly engaged by the drive chain 40. Driving power to chain 40 is supplied by means later to be described.

The rear sprocket 24 is carried at the lower end of an upright shaft 41 which is journaled and supported in a bearing block 42. The block 42 is longitudinally slidable with respect to the support member 25 but is adjustably affixed in a selected position by means of an adjusting bolt 43. The bolt 43 extends through and projects beyond a rigid cross piece 44. The cross piece 44 is rigidly secured to the support member 25 as, for example, by welding. A nut 45 threaded onto bolt 43 on the opposite side of cross piece 44 from the bearing block permits adjustment of the block and therefore provides the means of tensioning the chain 22 between its sprockets to the desired degree. The tension is increased by drawing the bolt further through the nut and relieved by backing off. It will be understood that the web of the support member 25 is slotted longitudinally for passage of shaft 41 therethrough in order to permit the necessary lengthwise displacement of the shaft.

The chain 22 serves as the carrier for the plurality of uniformly spaced egg pusher fingers 20. These fingers and their means of connection with the chain are all identical so a description in detail of one will be understood as applying to all others.

Each finger preferably is formed from a length of good quality metal wire stock. It has the arcuate portion 20a which runs through the trough 19. While the finger portion 20a is advancing through the trough, it has its concave side facing in the direction of advance as well as slightly upwardly. The section 20a includes spaced enlarged portions 46 which are of greater diameter than the wire and are so positioned relative to one another that when the egg E is oriented in the trough with its axis normal to the center line of the trough (position E of FIG. 1), the sections 46 engage the eggs near the ends with the central section of the finger section 20a therebetween out of contact with the egg. In other words, once the egg is oriented in the transverse rolling position, the only substantial contact between the finger and egg is that occuring between the sections 46 and the surface of the egg. In order to protect the egg from damage, sections 46 are preferably constructed of rubber-like material and may be most conveniently constructed from short lengths of rubber tubing sleeved over the finger section 20a and secured either by an inherent contractile grip or appropriate adhesives, or both, to the section 20a at the proper spacing thereon.

The spacing of the fingers 20 on the chain 22 is preferably as close as they can be set while still permitting free delivery of eggs therebetween by the feed mechanism 18. For practical purposes, the spacing should be no more than slightly greater than the maximum length of the eggs to be handled in the unit 18 so that each finger will pick up a single egg as a row is delivered from the feed unit. Of course, the spacing of the fingers must also be correlated with the spacing of the eggs in the rows of the feed unit, as will be evident.

The chain 22 is preferably a roller link chain. The opposite flights are guided for level movement by rails or tracks 47, 48, the track 47 being for the flight which runs adjacent trough 19. As best seen in FIG. 4, the parallel tracks are supported at suitably spaced intervals by hanger brackets 49 secured to and depending beneath the main support member 25.

Figure 5:
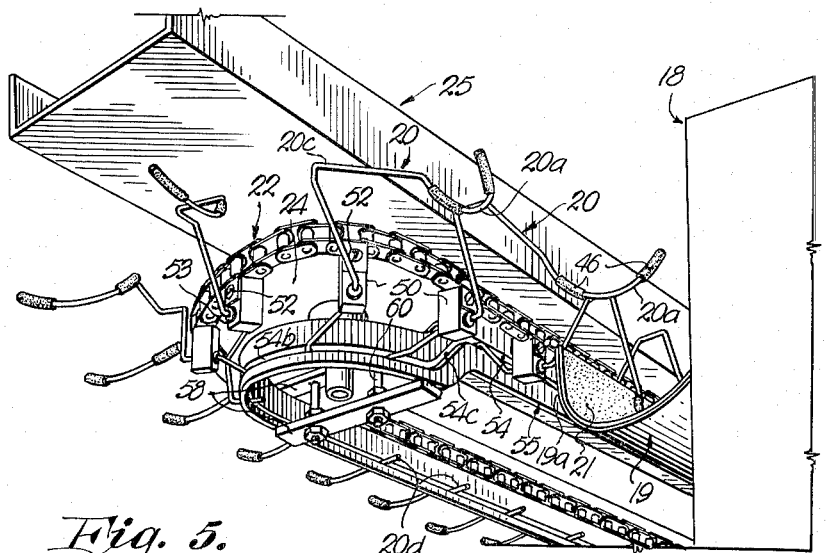

Each finger 20 is carried by a mounting block 50 which is secured to and depends beneath chain 22. The block may be detachably connected with the chain by providing an L-shaped bracket 51 having an upper horizontal leg riveted to the chain with a vertical leg depending below the chain. The block is secured to the vertical leg by a suitable screw 52 (FIG. 5).

The finger is pivotally supported by its block 50. To effect the pivotal connection, the finger is provided with the straight portion 20b which is journaled in the block in a suitable sleeve or other type bearing 53. The section 20a is radially offset from the pivot portion 20b so that any pivoting of the finger about the axis of portion 20b will result in angular displacement of section 20a. It will be observed that sections 20a and 20b are interconnected by a reversely bent U-shaped portion 20c which is so formed as to clear the upwardly extending outer wall 19a of trough 19.

During its movement through trough 19 each finger is held in the egg engaging position shown in FIGS. 1 and 4 by interengagement between a radially offset extension 20d on the finger and the edges of a camming slot 54 formed in an oval, generally band-like member 55 which is located beneath and slightly inwardly of chain 22. The slot 54 runs in a straight line parallel with the trough 19. Its length is substantially coterminous with the length of the trough.

At the forward end of the trough 19, the slot 54 merges with a descending transition slot 54a (FIG. 9) which joins at its lower end with a level continuation slot 54b proceeding on around the band 55 to a point just to the rear of the trough 19. This is best seen in FIG. 5. A similar rising transition 54c is provided to interconnect the lower slot 54b with the slot section 54 running adjacent the trough. As a result of the provision of the transition sections 54a and 54c, the fingers are raised and lowered at certain points during their movement around the chain path. The raising of the sections 20a occurs as the fingers leave the forward end of trough 19. In other words, when the fingers approach the forward end of the trough, the portion 20d of the finger is guided in a downward path by the transition slot sections 54, this causing rotation of the finger about the axis of its pivot portion 20b and the displacement of the section 20a in a forward and upward direction. During the continued movement on around on chain 22, the fingers are held in this lifted condition by the second level portion 54b of the slot and are again lowered by transition section 54c as they approach the entrance end of trough 19.

The band 55 is supported by any suitable means, such as the depending hanger arms 56 secured to the main support member 25. Clamping members 58 may be secured to cross elements 59 supported by the brackets, the connection between the latter two elements being accomplished by bolts 60.

Positioned in line with trough 19 and adapted to receive eggs therefrom and continue them onwardly in their path toward the pick-up means earlier described is a roller conveyor section generally indicated by the reference numeral 62. The general purpose of this section is to receive the eggs as they leave the discharge end 19b of trough 19 and to continue them onwardly in their path at substantially the same rate of movement while maintaining them in a crosswise or transverse orientation with respect to the path of advance.

The egg conveying elements of the roller conveyor 62 comprise the uniformly spaced twin rows of roller elements 63 which move in parallel paths in the direction of advance. They are so spaced, both axially and laterally, that they are adapted to support an egg between adjacent pairs.

Each line of rollers 63 is carried by its own independent endless chain 64, there being two such chains in spaced parallel relationship. The rollers are connected with the chains by rotary bearing sleeves 65 which are individually secured to the chains by brackets 66. Each roller is mounted on an axle 67 which is rotatably carried by the sleeve. The end of the axle opposite from the roller has secured thereto a cog wheel 68 which rides on a rack 69 during its movement along the path of the upper flight of the chain and away from the discharge end of trough 19.

The chains 64 are trained in each instance about end sprockets 70, 71, the sprockets 70 being adjacent the trough 19 and sprockets 71 adjacent the pick-up mechanism. Sprockets 70 are mounted in properly spaced relationship on a cross shaft 72 which is journaled in bearings 73 (FIG. 3) on opposite sides of the chain paths. These bearings are in turn supported on a structural framework including the elongate horizontal beams 74 which are carried by a base plate 75. Base plate 75 is in turn centrally supported by a floor engaging pedestal 29, the lower portion of which has not been shown.

The upper flight of each chain 64 is supported for horizontal movement by an elongate, lower horizontal rail 77 and parallel upper guide 77a. Each rail is carried by brackets 78 which are bolted to upstanding support legs 79 extending upwardly from the base plate 75. Any number of support legs and brackets may be employed as necessary to support the rails at the desired height. The lower flights of chains 64 are similarly supported against sagging, thus avoiding undue tension on the chain, by means of lower support rails 80 which are carried by brackets 81 similarly secured to the upstanding members. A top cover plate C, open above the rollers, may be utilized to shield the chains, etc.

It will be observed that the sprockets 70 are so located that the rollers 63 are moving in the horizontal path and departing from the sprockets as they emerge from beneath the trough 19. The plane of the uppermost surfaces of the rollers is approximately at the same level as the bottom of the trough so that eggs propelled off the end 19b of the trough are delivered onto the rollers and carried onwardly thereby.

The sprockets 71 at the other end of chains 64 are mounted on a common horizontal shaft 82 (FIGS. 1b, 2b and 6). This is essentially an idler shaft which is supported in suitable bearings 83 between upstanding side frame members 84 attached to and rigidly supported by the pedestals 14 of the pick-up mechanism.

Referring still more particularly to FIGS. 1b, 2b and 6, it will be observed that the chain conveyor 16 carrying the cradles 17 is a single chain unit which is so disposed as to have its upper flight angled upwardly and passing through the gap between the parallel lines of rollers 63. The chain 16 is trained around a sprocket 85 which is mounted on a shaft 86 journaled in the side frame members 84 in bearings 87 and disposed between the advancing upper and returning lower flights of the roller chains 64. The sprocket 85 is located between the chains and, therefore, there is no interference. The other end of chain 16 is trained about a sprocket 88 mounted on a shaft 89. This shaft is similarly supported by bearings 90 mounted to the pedestal 14 by members 91, 92. The upper flight of chain 16 passes over a support apron A which serves to guide the chain in an essentially horizontal path over a short run so that pick-up elements 11 move in registry with the cradle elements 17 for a short space of time.

Figure 8:
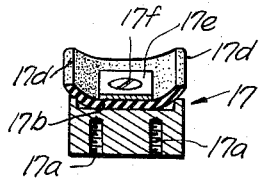
FIG. 8 is a sectional view taken along line 8—8 of FIG. 7 in the direction of the arrows.

The details of the individual cradles 17 are shown in FIGS. 8 and 9. The cradles are secured to the chain 16 by plates on the chain, the threaded apertures 17a being adapted to receive mounting screws (not shown). Each cradle has the concave upper surface 17b in which is received a rubber or other resilient member 17c providing the rib-like parallel edges 17d. The edges 17d are arcuate so as to conform generally to the cross-section of the egg. The member 17c is held in position by the clamp plate 17e and its associated screw 17f. The rib-like edges 17d engage the egg and lift it from the rollers. The cradles are so spaced, the conveyor 16 so located and the movements of chain 64 and the conveyor 16 so synchronized that a cradle arrives at the pick-up position with each egg.

In order to obtain proper synchronization of the motion of the respective components of the over-all unit, all mechanisms are driven from a single power source. We will assume that the source of power is connected with the pick-up unit chain 10 and is, therefore, supplying power for rotation of shaft 13 in the direction of arrow 93. This shaft carries a sprocket 94 which is connected by a chain 95 to a sprocket 96 on a parallel shaft 97 located above forward support shaft 89 for the conveyor 16. The shaft 97 has keyed thereto the gear 98 which meshes with a gear 98a on the shaft 89 of the conveyor 16. The gears provide the necessary reversal of motion in order to correlate the direction of movement of the pick-up chain with the conveyor chain 16.

The driven from the shaft 89 to the parallel roller chains 64 is achieved through utilizing the chain or conveyor 16 as a drive connection between shaft 89 and shaft 86. While the roller chains 64 are engaged by sprockets 99 under which the chains pass on the return flight, the principal driving force for the chains is supplied through shaft 72 at the front end of the roller conveyor. This shaft has the sprocket 100 which is drivingly connected with a sprocket 101 on shaft 86 by drive chain 102. This chain is parallel with the roller conveyor chains. The upper flight of drive chain 102 is supported against sagging in a guide channel 103 which may be mounted to the framework in any convenient fashion. The lower flight of chain 102 may be trained at an intermediate point over an idler sprocket (not shown) as is indicated by the inclined nature of the flights in the drawings.

The pusher fingers 20 are moved at a rate synchronized with the rate of advance of rollers 63 by means of a drive connection between shaft 72 and shaft 34. This drive connection includes the sprocket 104 at the outer end of shaft 72 which drivingly engages the chain 40 to the worm shaft 34 earlier described.

Finally, the rate of feeding of eggs from the supply mechanism 18 is synchronized with the pusher fingers 20 and rollers 63 by driving the mechanism 18 from a transmission 105 which is powered from shaft 72 through the chain 106. In other words, both the worm shaft 34 which provides the power to the pusher fingers and transmission 105 to the feed mechanism 18 are drivingly connected with the common shaft 72 of the roller conveyor 62.

In the operation of the invention, the rows of eggs E are fed from the feed mechanism 18 at uniformly spaced intervals into the trough 19. The interval between successive rows is that which is required for the six fingers 20 which respectively move against and advance the eggs to displace them to the forward end of the trough 19 and clear a space for the next row.

As each row is delivered to the trough, the fingers 20 in the path of the eggs engage and start them moving longitudinally of the trough. Because of the slight upward incline of the trough, the eggs tend to fall back toward the fingers and this tendency coupled with the ovoid or ellipsoidal shape results in substantially rapid reorientation of the eggs to an attitude in which the major axes are transverse to the direction of advance. The motion is thus converted from a generally tumbling action at first contact with the eggs to a relatively smooth rolling motion in a very short time interval. By providing the egg contacting surfaces 46 on the fingers 20, the maintenance of the eggs in the transverse rolling position is facilitated greatly. Moreover, the provision of these sections aids in the handling of eggs of different size. Because of the weight distribution as well as surface configuration, the eggs will inherently adjust themselves into the proper position in the pusher section 20c of the finger so that in all events they are delivered over the end 19b of the trough with their axes substantially normal to the direction of advance.

The rate of roller advance, and the position of the roller conveyor 62 relative to the end 19b of the trough is made such that as each egg moves across the end of the trough, a group of four rollers will be in position to receive the egg therebetween. Obviously, each egg is supported as it moves onto the roller conveyor by point contact at four spaced points.

As the rollers come up around the sprocket 70 in position to receive the eggs, they commence to rotate on their own axis due to meshing engagement of the cog wheels 68 with the underlying racks 69. As a result, the eggs are continually rotated about their own major axes as they are advanced by the rollers. This has the effect of causing the eggs to orient themselves in a position in which the major axis of the egg is substantially normal to the direction of advance.

Through the provision of the continuously rotating axially separated rollers 63, we are able to maintain eggs of differing size and shape in the desired crosswise orientation throughout the entire length of travel of the roller conveyor 62 and moreover to provide a conveyor which moves the eggs at a rapid rate. The provision of the four point contact with the eggs means that the eggs are firmly supported at all times and the rolling engagement permits the egg to adjust readily to the proper orientation and to maintain such orientation during its travel.

As the eggs individually move onto the rollers 63 from trough 19b, the pusher fingers 20 associated therewith are actuated by interengagement between transition slot 4a and the finger section 20d therein to raise the pusher sections 20c above the tops of the eggs so that the fingers can be turned away from the pushing path and returned back around the unit to the trough re-entry point. In the illustrated embodiment, the fingers are maintained in the return trip at the raised position due to the elevated nature of the slot section 54b. As they turn the corner to re-enter the trough, they are successively dropped to the operative position by cooperation between transition slot 54c and the engaged finger portions 20d. It will be evident, however, that the lowering of the fingers to the operative position could be effected at any point after their disengagement from the eggs at the forward end of the trough without any substantial change in the method of operation.

As we have previously seen, the eggs are transferred from rollers 63 to the cradles 17 of the conveyor unit 16. The speed of that conveyor and the spacing of the cradles is made such that a cradle comes into egg engaging and lifting position substantially as the lead rollers of an egg carrying quartet of rollers starts to drop away around the sprocket 71.

It will be noted that the rib-like edges 17d of the cradles are canted with respect to the chain 16 so that the ends of the rib-like edges are at substantially the same elevation when the cradle engages the underside of the egg. Since the rollers 63 operate to keep the largest diameter portion of the eggs substantally centrally between the parallel lines of rollers, that is in the gap between the lines of rollers, each egg is inherently positioned at the transfer point for smooth and stable pick-up by the cradles.

Since the pick-up mechanism illustrated in connection with the present invention requires the successive eggs to be spaced further apart than on the roller conveyor 62, the linear velocity of chain 16 is made greater than that of the roller chain 64 and this, of course, requires a greater spacing between cradles 17 than exists between the rollers 63.

From the foregoing, it will be seen that this invention is one well adapted to attain all of the ends and objects hereinabove set forth together with other advantages which are obvious and which are inherent to the structure. While the invention has been described in specific conjunction with the handling of eggs, the principles are equally applicable to the handling of other articles of similar ellipsoidal or ovoidal shape.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for receiving and conveying egg-shaped articles from a source of such articles from which the articles are fed in successive rows, said apparatus comprising an elongate trough having an article receiving section positioned to receive the rows of articles with each said row aligned with the long axis of said section, pusher means in said trough including a plurality of pusher elements spaced to receive said articles therebetween as they are deposited in said section, carrier means for advancing said pusher elements lengthwise of the trough to propel said articles from said section and along the trough, said trough being upwardly inclined in the direction of advance, each of said pusher elements having the form of a curved rod-like member arranged transversely of the trough with the concave side of the curve toward the direction of advance, said curved rod-like member having mounted thereon at spaced locations resilient elements presenting article contacting surfaces spaced from one another transversely of the trough and operable to cooperate with one another and with the surface of an article to orient and maintain said article in a stable rolling position on the bottom of the trough with the long axis of each article transverse to the long axis of the trough.

2. Apparatus as in claim 1 wherein said carrier means comprises an endless flexible member having a portion extending alongside said trough, and said pusher elements are mounted to said carrier means.

3. Apparatus as in claim 1 wherein said trough is provided with a discharge end, and including conveyor means having moving components operating in timed relationship with said pusher elements to receive each said article as it is advanced over said discharge end and carry it away from said discharge end.

4. Apparatus as in claim 3 including means operable to effect disengagement between said pusher elements and articles as the latter are delivered to said conveyor means.

5. Apparatus as in claim 3 wherein said conveyor means comprises a roller conveyor in which parallel lines of roller members provide support for the articles, the lines of rollers advancing beneath and past the discharge end of said trough at approximately the same elevation as the discharge end of the trough whereby to receive the articles in smooth transition from the trough.

6. Apparatus as in claim 1 wherein said trough has a bottom surface which rises in elevation in the direction of advance of the articles in the trough.

7. Apparatus for receiving and conveying egg-shaped articles from a source of such articles from which the articles are fed in successive multiple article rows with the long axes of the articles generally aligned in the rows, said apparatus comprising an article conveying trough having a section thereof disposed with its long axis transverse to the direction of advance of the rows and in position to receive the succeeding rows, a flexible endless carrier having a portion substantially parallel and coterminous with the trough, drive means for said carrier, a plurality of similar pusher member mounted in spaced relation along said carrier, each said pusher member being pivoted to said carrier and including a pusher element radially offset from the pivot axis and disposed to move through said trough as said carrier is driven, and camming means for effecting pivotal movement of each said pusher member to raise and lower said pusher element at selected locations along the path of movement thereof.

8. Apparatus for receiving and conveying egg-shaped articles from a source of articles from which the articles are fed in successive multiple article rows with the long axes of the articles generally aligned in the rows, said apparatus comprising an article conveying trough having a section thereof disposed with its long axis transverse to the direction of advance of the rows and in position to receive the succeeding rows from said source, a flexible endless carrier having a portion substantially parallel and coterminous with the trough, drive means for said carrier, a plurality of similar pusher members mounted in spaced relation along said carrier, each said pusher member being pivoted to said carrier and having a pusher element radially offset from the pivot axis and disposed to move through said trough, camming means for effecting pivotal movement of each said pusher member to raise and lower said pusher element at selected locations along the path of movement thereof, each pusher element having article engaging surfaces which, when in the lower position of the element, are operable to orient and maintain the article in rolling position with the long axis transverse to the trough.

9. Apparatus as in claim 8 wherein said camming means include a stationary camming surface and follower means connected with each said pusher member.

10. Apparatus as in claim 8 wherein each said pusher element is in the form of a curved rod-like member arranged transversely of the trough with the concave side of the curve toward the direction of advance.

11. Apparatus as in claim 10 wherein said curved rod-like member has mounted thereon at spaced locations resilient elements presenting article contacting surfaces spaced from one another transversely of the trough.

12. Apparatus for receiving and conveying egg shaped articles from a source of such articles from which the articles are fed in successive rows, said apparatus comprising an elongate trough having an article receiving section positioned to receive the rows of articles with each said row aligned with the long axis of said section, pusher means in said trough including a plurality of pusher elements spaced to receive said articles therebetween as they are deposited in said section, carrier means for advancing said pusher elements lengthwise of the trough to propel said articles from said section and along the trough, each of said pusher elements having article contacting surfaces operable to cooperate with one another and with the surface of an article to orient and maintain said article in a stable rolling position on the bottom of the trough with the long axis of each article transverse to the long axis of the trough, said trough having a discharge end, and conveyor means having moving components operating in timed relationship with said pusher elements to receive each said article as it is advanced over said discharge end and carry away from said discharge end, said conveyor means comprising a roller conveyor in which parallel lines of roller members provide support for the articles, the lines of rollers advancing beneath and past the discharge end of said trough at approximately the same elevation as the discharge end of the trough whereby to receive the articles in smooth transition from the trough.

13. Apparatus for receiving and conveying egg shaped articles from a source of such articles from which the articles are fed in successive rows, said apparatus comprising an elongate trough having an article receiving section positioned to receive the rows of articles with each said row aligned with the long axis of said section, pusher means in said trough including a plurality of pusher elements spaced to receive said articles therebetween as they are deposited in said section, carrier means for advancing said pusher elements lengthwise of the trough to propel said articles from said section and along the trough, each of said pusher elements having article contacting surfaces operable to cooperate with one another and with the surface of an article to orient and maintain said article in a stable rolling position on the bottom of the trough with the long axis of each article transverse to the long axis of the trough, said trough having a discharge end, and conveyor means having moving components operating in timed relationship with said pusher elements to receive each said article as it is advanced over each discharge end and carry away from said discharge end, said conveyor means comprising a roller conveyor in which parallel lines of roller members provide support for the articles, the lines of rollers advancing beneath and past the discharge end of said trough at approximately the same elevation as the discharge end of the trough whereby to receive the articles in smooth transition from the trough, and a series of cradle elements disposed and operated to rise sequentially between said lines at a selected location therealong to lift articles individually from said roller members as they arrive at said location.

References Cited by the Examiner

UNITED STATES PATENTS

| | | | |
|---|---|---|---|
| 2,154,844 | 4/1939 | Harker | 198—183 |
| 2,272,677 | 2/1942 | Meneray | 198—183 |
| 2,684,748 | 7/1954 | Sneed | 198—33 |
| 2,961,087 | 11/1960 | Reading | 198—33 |
| 3,039,591 | 6/1962 | Willsey | 88—14.8 X |
| 3,075,629 | 1/1963 | Gibbs | 198—33 |
| 3,077,257 | 2/1963 | Niederer | 88—14.8 X |

SAMUEL F. COLEMAN, *Primary Examiner.*

EDWARD A. SROKA, *Examiner.*